(12) United States Patent
Abler

(10) Patent No.: US 6,731,645 B1
(45) Date of Patent: May 4, 2004

(54) METHODS, SWITCHES, SYSTEMS, AND COMPUTER PROGRAM PRODUCTS FOR FAIR TRANSMISSION OF DATA RECEIVED AT MULTIPLE INPUTS IN THE ORDER RECEIVED IN A QUEUED MEMORY SWITCH

(75) Inventor: Joseph Michael Abler, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/515,829

(22) Filed: Feb. 29, 2000

(51) Int. Cl.[7] .............................................. H04L 12/56
(52) U.S. Cl. ...................................... 370/416; 370/462
(58) Field of Search ................................. 370/230, 235, 370/395.4, 395.41, 395.42, 386, 387, 388, 412, 428, 429, 417, 413, 414, 415, 416, 418

(56) References Cited

U.S. PATENT DOCUMENTS

| | | | |
|---|---|---|---|
| 5,008,878 A | | 4/1991 | Ahmadi et al. ................ 370/60 |
| 5,157,654 A | | 10/1992 | Cisneros ...................... 370/60 |
| 5,256,958 A | * | 10/1993 | Eng et al. ..................... 370/389 |
| 5,412,646 A | | 5/1995 | Cyr et al. ..................... 370/56 |
| 5,526,352 A | | 6/1996 | Min et al. ..................... 370/60 |
| 5,572,522 A | | 11/1996 | Calamvokis et al. ....... 370/60.1 |
| 5,574,885 A | | 11/1996 | Denzel et al. ............... 395/492 |
| 5,636,210 A | | 6/1997 | Agrawal ...................... 370/390 |
| 5,724,351 A | | 3/1998 | Chao et al. .................. 370/395 |
| 5,745,486 A | | 4/1998 | Beshai et al. ............... 370/352 |
| 5,892,766 A | * | 4/1999 | Wicki et al. ................. 370/412 |
| 5,956,342 A | * | 9/1999 | Manning et al. ............ 370/414 |
| 5,982,771 A | * | 11/1999 | Caldara et al. .............. 370/389 |
| 6,141,346 A | * | 10/2000 | Caldara et al. .............. 370/390 |
| 6,349,097 B1 | * | 2/2002 | Smith ........................... 370/390 |
| 6,442,172 B1 | * | 8/2002 | Wallner et al. .............. 370/416 |
| 6,473,428 B1 | * | 10/2002 | Nichols et al. .............. 370/395.1 |
| 6,643,294 B1 | * | 11/2003 | Cooperman et al. ........ 370/413 |
| 2001/0050916 A1 | * | 12/2001 | Krishna et al. ............. 370/419 |
| 2002/0032796 A1 | * | 3/2002 | Van Loo ...................... 709/235 |
| 2003/0133406 A1 | * | 7/2003 | Fawaz et al. ................ 370/229 |

FOREIGN PATENT DOCUMENTS

| | | |
|---|---|---|
| JP | 7-336356 | 12/1995 |
| WO | WO 97/29613 | 8/1997 |

OTHER PUBLICATIONS

IBM Technical Disclosure Bulletin, "Combined Redundancy and Speed–Expansion Concept," vol. 36, No. 11, Nov. 1993.

IBM Technical Disclosure Bulletin, "Combining Multiple Shared–Buffer Packet Switching Modules to Improve Switch Buffer Capacity," vol. 36, No. 11, Nov. 1993.

* cited by examiner

Primary Examiner—Hassan Kizou
Assistant Examiner—Christopher M Swickhamer
(74) Attorney, Agent, or Firm—Myers Bigel Sibley & Sajovec P.A.

(57) ABSTRACT

A queued memory switch includes separate devices that switch received data to the outputs of the queued memory switch. Data is received by a first device (the master) and a second device (the slave) at a series of reception times. The slave sends information to the master indicating whether data directed to an output port was received by the slave at each of the reception times. The master stores the information from the slave with information indicating whether data directed to the same output port was received by the master at each of the reception times. The information indicates the order in which the master and slave received their respective data. The indication can be used to transmit the data from master and the slave in the order in which the data was received by the master and the slave. Related methods, systems, and computer program products are also disclosed.

25 Claims, 14 Drawing Sheets

| Master Received Data | Slave Received Data | Entry Referencing Slave? | Packet Address |
|---|---|---|---|
| No | No | No Entry | No Entry |
| No | Yes | 1 | Null |
| Yes | No | 0 | Address |
| Yes | Yes | 1 | Address |

FIG. 6

| C4 | B4 | A4 | C3 | B3 | A3 | C2 | B2 | A2 | C1 | B1 | A1 |

FIG. 8A

| C4 | C3 | C2 | C1 | B4 | B3 | B2 | B1 | A4 | A3 | A2 | A1 |

FIG. 10

METHODS, SWITCHES, SYSTEMS, AND COMPUTER PROGRAM PRODUCTS FOR FAIR TRANSMISSION OF DATA RECEIVED AT MULTIPLE INPUTS IN THE ORDER RECEIVED IN A QUEUED MEMORY SWITCH

FIELD OF THE INVENTION

The present invention relates to the field of communications in general, and more particularly to network communications.

BACKGROUND OF THE INVENTION

Network switches (switches) may provide for the transmission of data from inputs of the switch to outputs of the switch. For example, a switch having N inputs and N outputs (an N×N switch) may provide connectivity between any of the N inputs and any of the N outputs. Data received on an input can typically be switched to any of the outputs of the switch.

FIG. 1 is a block diagram which illustrates a 2N×2N switch that uses 4 N×N switch elements to allow data received at any of the switch's 2N input ports to be switched to any of switch's 2N output ports. In particular, first through fourth switch elements 100a–d provide switching wherein data received on any of the input ports 1–2N can be switched to any number of the output ports 1–2N. For example, data received at input port 1 can be switched to the Output ports 1 to N through the first switch element 100a and/or to the output ports N+1 to 2N through the second switch element 100b. Similarly, data received at input port N+1 can be switched to output ports 1 to N through the third switch element 100c and/or to the output ports N+1 to 2N through the fourth switch element 100d. According to FIG. 1, the switch elements can represent separate integrated circuit devices.

Data received at the input ports 1–2N can typically be directed to any combination of the output ports 1–2N. For example, data received at input port 1 may be directed to a single output port or to all of the output ports. Furthermore, data received at more than one input port can be directed to a common output port. For example, data that is to be directed to output port 1 can be received at all input ports 1–2N. Moreover, the data can be received simultaneously. Consequently, each of the output ports has an associated queue that can be used to store data directed to that output port until the output port is available for transmission. Thus, a switch having N output ports can have N queues (one queue associated with each output port).

Additional switch elements can be added to the switch to increase the amount of data that the switch can process. For example, an N×N switch can be expanded to a 2N×2N switch by quadrupling the number of switch elements. For example, according to FIG. 1, the first switch element 100a may be used to implement an N×N switch. To expand the switch to 2N×2N, four switch elements are needed (i.e., the relationship between the number of input and outputs that can be switched and the number of switch elements can be quadratic). Moreover, as more switch elements are added, more switch elements may need to be coordinated during transmission of data from the output ports. For example, both the first switch element 100a and the third switch element 100c can transmit data onto output port 1. Accordingly, the transmission of data by the first and third switch elements 110a, c may need to be coordinated to reduce the likelihood of contentions on the output ports which they share.

A centralized queue control circuit 105 can control which of the switch elements may transmit. For example, if two streams of data each directed to the output port 1 are received at input port 1 and input port N+1 respectively, the centralized queue control circuit 105 controls when the first switch element 110a transmits on the output port 1 and when the third switch element 100c transmits data on the output port 1. Accordingly, the centralized queue control circuit 105 may first enable the first switch element 100a to transmit on the output port 1 and then enable the third switch element 100c to transmit on the output port 1. The centralized queue control circuit 105 can "ping-pong" between enabling the first and third switch elements to switch the two streams of data to the output port 1. Unfortunately, the "ping-pong" approach described above may result in an uneven or "unfair" allocation of the output port bandwidth among the switch elements used to switch the data to the desired output port. In particular, if a first switch element receives data directed to an output port at more input ports than does a second switch element, the bandwidth allocated to the first switch element can be divided among more input ports. Consequently, the bandwidth available to each of the input ports of the first switch element is a fraction of the total bandwidth allocated to the first switch element. For example, if data directed to output port 1, is received at input ports 1 to N of the first switch element 100a and at input-port N+1 of the third switch element 100c, the first switch element 100a will queue data received at input ports 1 to N while the third switch element 100c will queue data received at input port N+1.

The centralized queue control circuit 105 can alternatingly select the first switch element 100a and the third switch element 100c for transmission therefrom. Alternating between the first and third switch elements 100a, c may result in 50% of the output port bandwidth being allocated to the each of the switch elements. For a switch element of size N=16 this may result in input ports 1–16 each obtaining approximately 3% of the output port bandwidth while input port 17 receives 50% of the bandwidth. Accordingly, there continues to exist a need to provide queued memory switches that can be expanded while maintaining fairness thereof without adding undue complexity to the associated control logic.

SUMMARY OF THE INVENTION

The present invention can provide methods, switches, systems, and computer program products that allow improved fairness in queued memory switches when devices are added to the queued memory switch to increase the capacity thereof by enabling the devices to transmit the data in the order in which the data was received.

In one embodiment of the present invention, first and second data are received at first and second inputs of first and second devices included in the queued memory switch. The first and second data are directed to the same output of the queued memory switch. An indication is made of the order of reception of the first and second data at the first and second devices. The first and second data are transmitted from the output of the queued memory switch in the indicated order of reception. Therefore, the unfair distribution of output port bandwidth associated with some conventional systems described above, may be reduced by enabling the devices to transmit the data in the order in which the data was received.

In another embodiment of the present invention, the first and second data are respective first and second cells of data. Alternatively, the first and second data may be respective first and second frames of data.

In yet another embodiment of the present invention, the indication includes a series of indications of the reception of the first and second data at a series of reception times.

In a still further embodiment of the present invention, the indication includes indicating reception of the first data and non-reception of the second data if the first data is received at a reception time and the second data is not received at each reception time. Alternatively, the indication includes indicating non-reception of the first data and reception of the second data if the second data is received at the reception time and the first data is not received at each reception time. Finally, the indication may include indicating the reception of the first data and reception of the second data if the first and second data are received at each reception time.

In still another aspect of the present invention, the indication includes storing a first indication of the reception of the first data at each reception time and storing a second indication of the reception of the second data at each reception time.

In another aspect of the present invention, the data is transmitted by determining that the output of the queued memory switch is available for data transmission, and transmitting a grant from the first device to the second device in response to the indication that the first and second data were received at the reception time, and transmitting the second data from the second device on the output of the queued memory device responsive to the grant.

BRIEF DESCRIPTION OF THE DRAWINGS

FIG. 6 is a table that illustrates exemplary indications of data received according to the present invention.

FIG. 8A is a diagram that illustrates Cells transmitted from the output port of the queued memory switch of FIG. 2 according to a first embodiment of the present invention.

FIG. 10 is a diagram that illustrates data included in frames transmitted from the output port of a queued memory switch of FIG. 2 according to a second embodiment of the present invention.

DETAILED DESCRIPTION OF THE INVENTION

Figure 1:
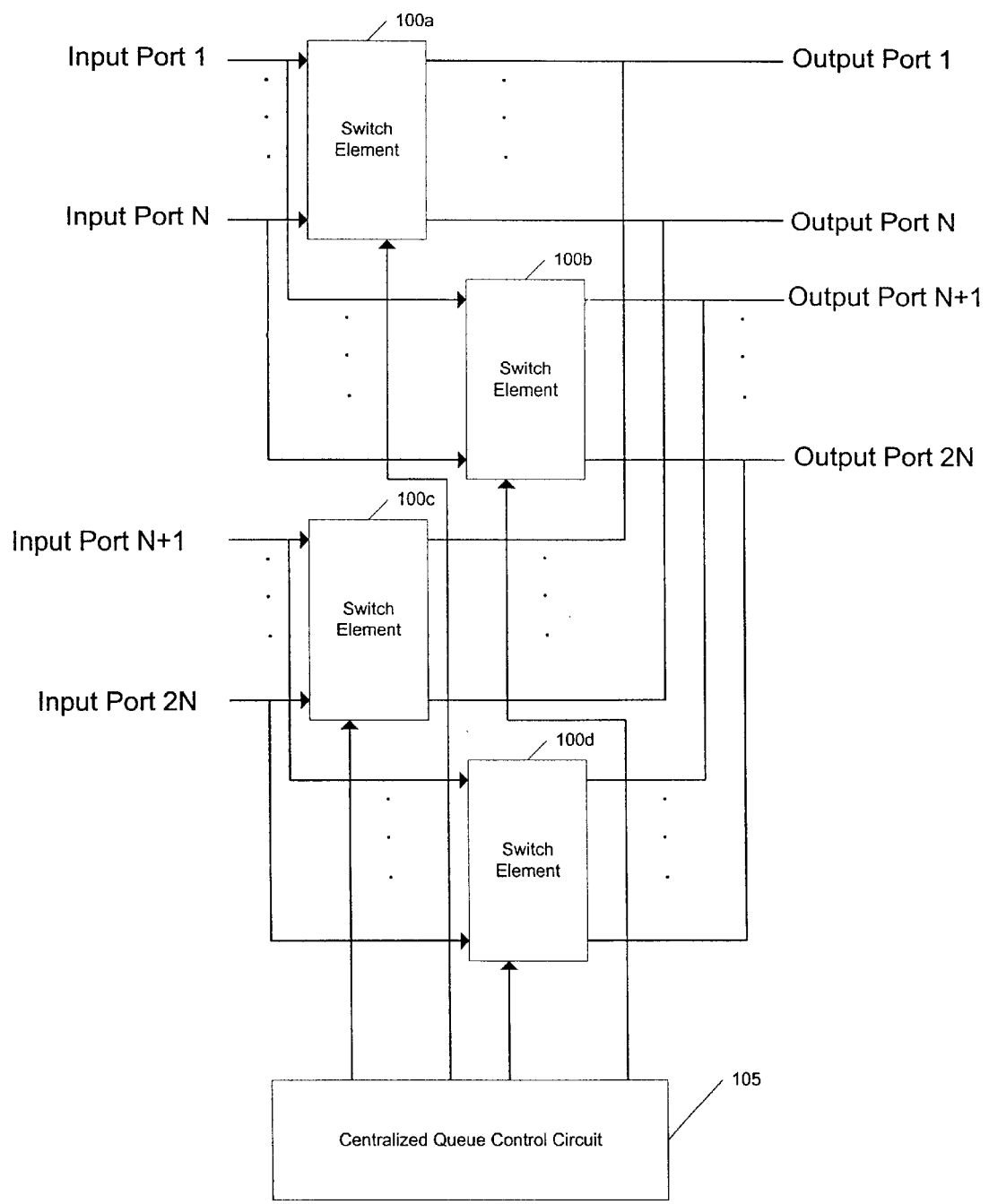
FIG. 1 is a block diagram that illustrates a conventional 2N×2N queued memory switch.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods, devices and/or computer program products. Accordingly, the present invention may take the form of an entirely hardware embodiment, an entirely software embodiment or an embodiment combining software and hardware aspects.

The present invention is also described using block diagrams and flowcharts. It will be understood that each block (of the block diagrams and/or the flowchart), and combinations of blocks, can be implemented by computer program instructions. These program instructions may be provided to a processor(s) within the queued memory switch, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

As used herein, the term "queued memory switch" is used to describe circuits that allow input data received at the input ports of the circuit to be transferred to the output ports of the circuit. In particular, data received by the queued memory switch is directed to at least one output port thereof. For example, in a 32×32 queued memory switch, data received at input port 32 can be directed to any of the 32 output ports. If the output port to which the data is directed is available for transmission, the received data may be transmitted immediately. If the output port is not available, the data can be stored in a memory (or queue) for later transmission. Alternatively, the queuing can be associated with the input ports or the output ports.

The memory in the queued memory switch can be dedicated. In particular, memory can be shared among the output ports (or input ports) or can include portions dedicated to a particular output port (or input port). For example, a 32×32 queued memory switch may include a memory that is shared to provide one output queue for each output port (i.e., 32 output queues). Accordingly, the present invention can be utilized to provide switches having shared memory input queuing, shared memory output queuing, dedicated memory input queuing, and dedicated memory output queuing.

It will be understood that the queues may be provided by any technique known to those skilled in the art. In one embodiment, for example, the queues are provided by a data structure that includes a series of pointers that point to locations in the memory in which received data is stored. The queue can be comprised of linked lists of pointers generated as the data is received. During transmission the linked list can be followed to allow transmission of data in sequence.

According to the present invention, a queued memory switch can include separate integrated circuit devices that switch received data to the output ports of the queued memory switch. Each of the devices can include a memory that is shared to provide queues associated with each of the outputs of each device.

A first device (a master) detects the reception of data at the inputs thereto and receives information from a second device (a slave) at a series of reception times. The information indicates whether data was received by the slave and identifies the output port(s) to which the received data is directed. The information can be used by the master to determine when data was received by the slave relative to the time that data was received by the master.

The information can be used to control the respective queues in the master and slave devices to function as a single logical queue for each output port of the queued memory switch. For example, a first queue in the master associated with output port 1 can operate in cooperation with a second queue in the slave also associated with output port 1 to function as a single logical queue for output port 1.

In particular, the slave sends information to the master indicating whether data directed to an output port was received by the slave at each of the reception times. The master stores the information from the slave with information indicating whether data directed to the same output port was received by the master at each of corresponding reception times. The information can be used by the master device to determine when data was received by the slave relative to the time that data was received by the master device. The master may then control the transmission of data from the queues in the master and the slave in the order in which the data was received, thereby allowing fair service to all input ports attempting to access the same output port.

In particular, the master device can transmit data from the queues in the master or send grants to the slave device that enable the slave device to transmit data from the queues in the slave. For example, if the master device determines that data was received by the master device earlier than the data received by the slave device, the data received by the master device can be transmitted before the data received by the slave device. In particular, the data received by the slave device can be transmitted by the slave device in response to grants transmitted by the master device to the slave device.

Accordingly, fairness in queued memory switches can be improved when devices are added to the queued memory switch to increase the capacity thereof. Therefore, the unfair distribution of output port bandwidth associated with some conventional systems described above, may be reduced by allowing the master to enable the slave to transmit data under the control of the master.

Figure 2:
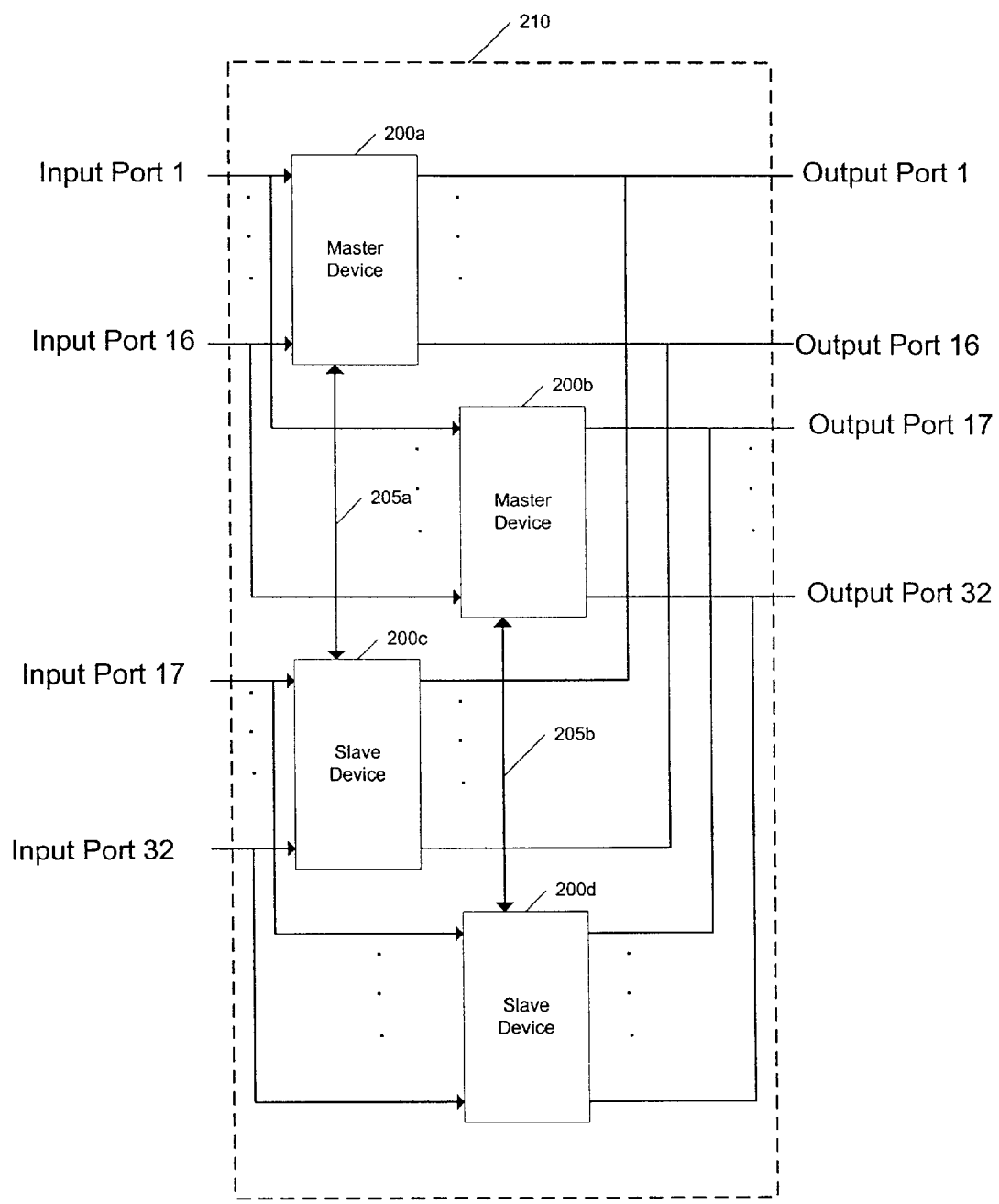
FIG. 2 is a block diagram that illustrates embodiments of a 32×32 queued memory switch according to the present invention.

FIG. 2 is a block diagram that illustrates a first embodiment of a queued memory switch 210 according to the present invention. As shown in FIG. 2, the queued memory switch 210 includes 32 input ports and 32 output ports (i.e., a 32×32). Data is received by the queued memory switch 210 via the input ports 1–32 and is transmitted from the queued memory switch 210 via the output ports 1–32. Although the present invention is discussed herein by reference to a 32×32 queued memory switch that includes the aspects of the present invention, it will be understood that the present invention can be practiced in switches having greater or lesser capacity.

The queued memory switch 210 includes four separate devices 200a-200d. Each of the devices 200a–200d has 16 inputs that receive input from 16 of the input ports of the queued memory switch 210. In particular, the inputs of the first and second devices 200a–200d receive input from the input ports 1–16. The inputs of the third and fourth devices 200c–200d receive input from the input ports 17–32. The outputs of the first and third devices 200a, 200c provide output to the output ports 1–16. The outputs of the second and fourth devices 200b, 200d provide output to the output ports 17–32.

Each of the first through fourth devices includes a queue associated with each output of the respective device. For example, a device having 16 outputs can include 16 queues, one for each of the outputs of the device. When data directed to an output of the device is received, the data may be transmitted or placed in the queue associated with the output to which the data is directed. The queues can be implemented as part of the shared memory included in the device (not shown). It will be understood that the queues described herein can also be provided for each priority level associated with data. For example, if 3 priority levels of data are provided, each output port can have three queues associated therewith.

According to the present invention, the first and third devices 200a,c operate as master and slave devices respectively. Similarly, the second and fourth devices 200b,d operate as master and slave devices respectively. The master and slave devices communicate via first and second interfaces 205a–b. The master device 200a receives information from the slave device 200c indicating whether data directed to an output port was received by the slave at each of the reception times. Furthermore, the information can include an indication of which output port the data received by the slave is directed to and the priority associated with the data.

The master device 200a also sends grants to the slave devices 200c to enable transmission of data therefrom. Thus, the respective queues of the master and slave devices 200a,c are controlled to provide a logical queue associated with each output port. For example, a first queue associated with output 1 of the first master device 200a operates in cooperation with a second queue associated with output 1 of the first slave device 200c to function as a single logical queue for output port 1 of the queued memory switch 210.

Although FIG. 2 illustrates a 2N×2N switch, it will be understood that the present invention can be used in switches having greater capacity. For example, the present invention may be used in a 3N×3N switch or an 8N×8N switch. In particular, in switches having capacities such as these, the methods and systems described above can be implemented in a separate device which does not perform data switching operations. For example, in a 3N×3N switch, a separate device may be implemented whereby the separate device receives the information from each of the slave devices and transmits grants thereto.

Figures 3A, 3B:
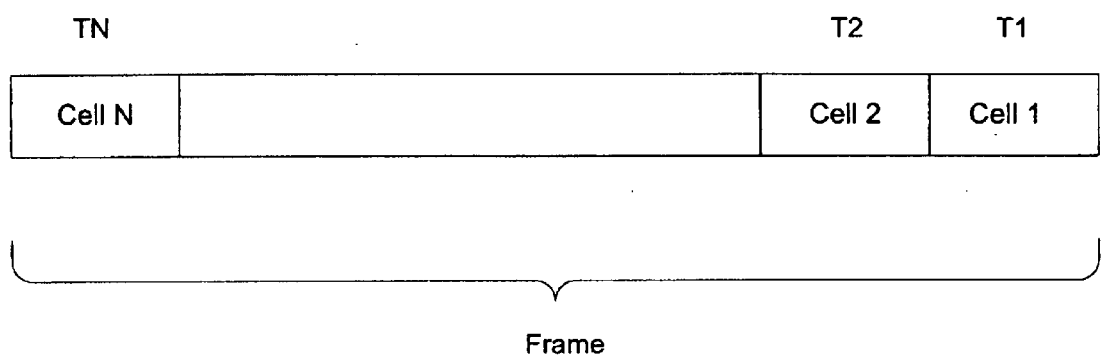
FIG. 3A is a diagram that illustrates a Cell format including received data.
FIG. 3B is a diagram that illustrates Cells received by the queued memory switch of FIG. 2 at a series of reception times.

The data received and transmitted can be organized in any format known to those skilled in the art. For example, data received by the queued memory switch 210 can be included in cells as shown in FIG. 3A. According to FIG. 3A, the cell can also include an address that is used by the device to identify which output port(s) the data is directed to. The address can specify any combination of output ports to which the data should be directed. For example, the address can specify that the data is directed to output port 1 (a unicast), to output ports 1–8, or to output ports 1–16 (a multicast). Other combinations of output ports to which the data is directed are possible.

The cell can also include a priority level which indicates the quality of service associated with the data included in the cell. The priority level can be used to increase the amount of bandwidth allocated to data included in cells having that priority. For example, data included in cells having relatively high priority can be transmitted in advance of earlier received data included in cells having a lower priority. As will be appreciated by those having skill in the art, other formats can also be used. For example, an embodiment of the present invention directed to data organized as frames is described herein in reference to FIG. 9.

As used herein, the term data includes data received as part of a transmission formatted as described herein. For example, the term data includes data included in transmissions formatted as cells, frames, or other formats know to those skilled in the art. Furthermore, the term "data" can include a single data unit received at a reception time or a series of data units received over a series of reception times. For example, the term data can include the data included in ten cells received at ten different reception times. Accordingly, if the data is organized as data units including the data from ten cells, the data units are transmitted in the order in which the data units were received by the queued memory switch. Moreover, the data included within any of the data units can be transmitted in an arbitrary order.

Furthermore, when data is described herein as being received, it will be understood that other portions of a cell or other format may also be received. For example, with regard to a cell format such as that described in reference to FIG. 3A, when data is described herein as being received, it will be understood that the address and priority associated with the data in the cell format can also be received at the same time by the device.

FIG. 3B is a diagram that illustrates data received by the queued memory switch 210 at a series of reception times. The data can be received at any of the input ports of the queued memory switch 210 at the reception times T1–TN. For example, data can be received at all of the input ports 1–32 at reception time T1. Moreover, the data included in the cells received at the input ports 1–32 can be directed to any combination of the output ports 1–32. For example, data directed to output port 1 can be received at all input ports 1–32 at reception time T1. In other words, data directed to the same output port can be simultaneously received at all 32 inputs at T1. Accordingly, the queue associated with output port 1 is loaded with the data included in the 32 received cells.

Figure 4:
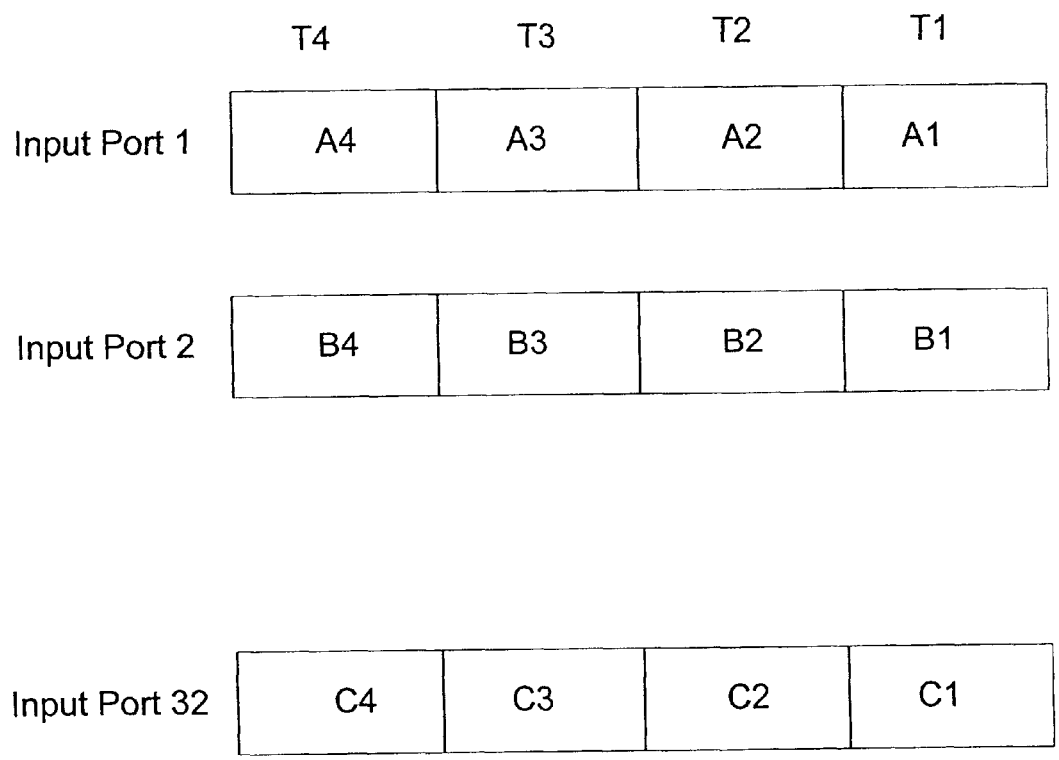
FIG. 4 is a diagram that illustrates exemplary arrivals of Cells at the input ports of the queued memory switch of FIG. 2 at a series of reception times.

FIG. 4 is a diagram that illustrates exemplary reception of data by a queued memory switch 210 at reception times T1–T4 as shown in FIG. 3B. It will understood that all of the data shown in FIG. 4 has the same priority level. In operation, data A1–A4 is received at the input port 1 at reception times T1–T4 respectively. Data B1–B4 is received at input port 2 at reception times T1–T4 respectively. Similarly, data C1–C4 is received at input port 32 at reception times T1–T4 respectively. Therefore, according to FIG. 4, the queued memory switch 210 receives data (A, B, and C) at each of the reception times T1–T4. According to FIG. 4, all of the data is directed to the output port 1.

Figure 5A:
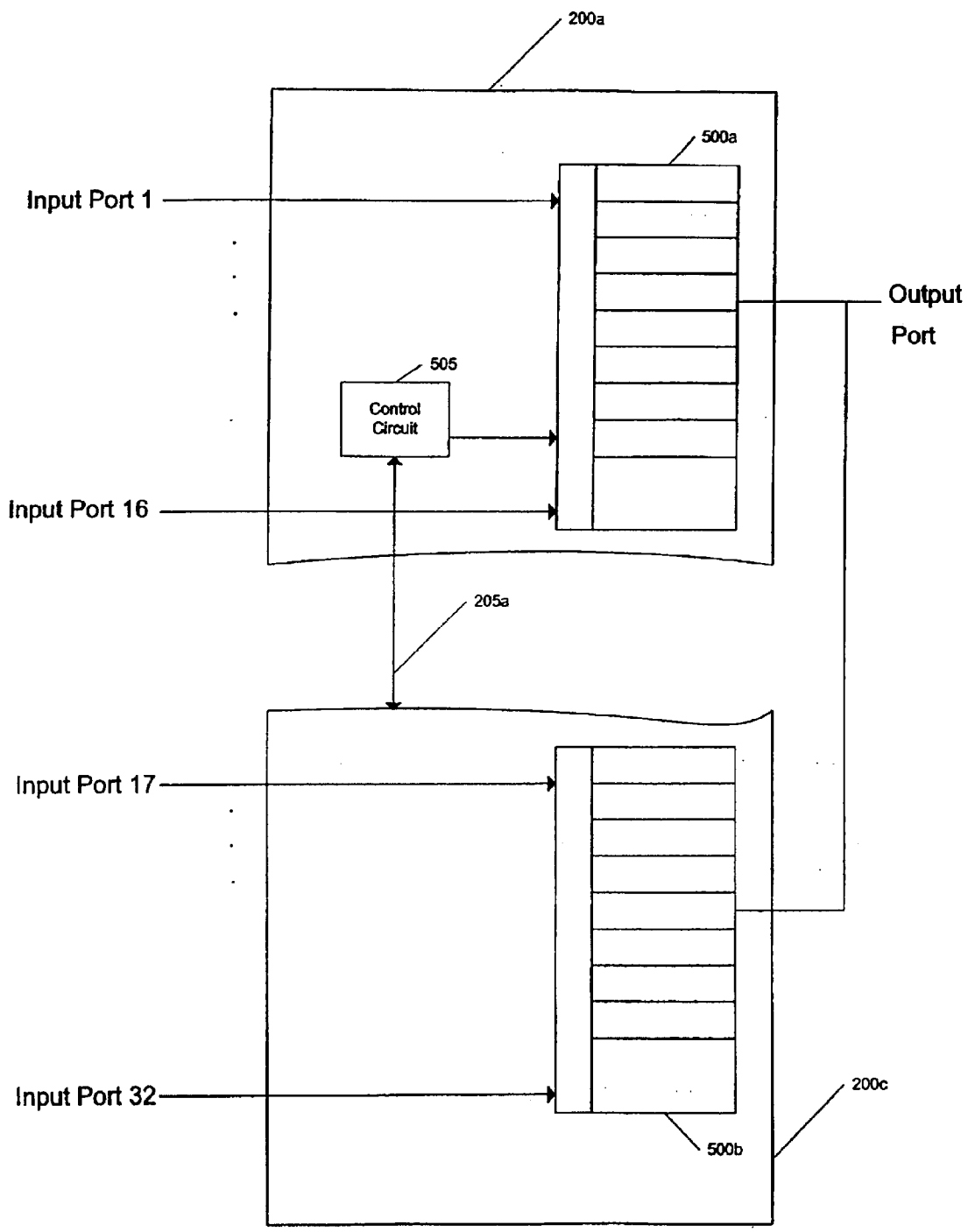
FIG. 5A is a block diagram of an embodiment of a queued memory switch shown in FIG. 2 according to the present invention.

FIG. 5A is a block diagram of an embodiment of a queued memory switch 210 shown in FIG. 2. The master and slave devices 200a,c each include a plurality of queues wherein each queue is associated with an output port of the queued memory switch 210. For simplicity, only one queue is shown in the master and slave devices of FIG. 5A. It will be understood that additional queues can be present. In particular, FIG. 5A shows a first queue 500a in the master device 200a and a second queue 500b in the slave device 200c. The respective outputs of the first and second queues 500a–b are associated with an output port of the queued memory switch 210.

As described above in reference to FIG. 2, the respective queues of the master and slave devices 200a,c can function as a single logical queue for each output port of the queued memory switch 210. The first and second queues 500a–b can be implemented as respective portions of the shared memory included in the master and slave devices 200a,c. For example, the first queue 500a can be implemented using the shared memory included in the master device 200a and the second queue can be implemented using the shared memory included in the master device 200c.

In operation, the first and second queues 500a–b can store the data received by the master and the slave respectively. For example, according to the example shown in FIG. 4, data A1–A4 and B1–B4 is received at the inputs 1 and 2 of the master device 200a and data C1–C4 is received at the input 32 of the slave device 200c. Accordingly, data A1–A4 and B1–B4 can be stored in the first queue 500a and data C1–C4 can be stored in the second queue 500b.

A control circuit 505 in the master device 200a detects the reception of data at the inputs thereto and receives information from the slave device 200c via the interface 205a. The information indicates whether the slave device 200c received data at the same reception time and identifies the output port to which the received data was directed. The information can be used by the master device 200a to determine when data was received by the slave relative to the reception of data directed to the same output port by the master device 200a.

The information can include an indication that data was received by the slave device 200c, the output port to which the received data is directed, and an associated priority of the data. In one embodiment, the information can be provided as 5 bits where 1 bit indicates that data was received by the slave device 200c and 4 bits encode the output port to which the received data is directed. In another embodiment, the information can be a bit map where each bit of the bit map is associated with a corresponding output port. When a bit is set, for example, the bit would indicate that the data is directed to the corresponding port. More than one bit in the bit map can be set thereby enabling the data to be directed to more than one output port (such as in a multicast operation). The information can be sent by the slave device 200c for each input port that received data.

The master device 200a stores the information received from the slave 200c with the information that indicates whether data directed to the same output port was received by the master device 200c at each of the reception times. Accordingly, the information can be used to determine the order in which the master and slave devices 200a,c received their respective data. This determination can be used to transmit the data from master and the slave devices 200a,c in the order in which the data was received by the master and the slave devices 200a,c.

In particular, the master device 200a can transmit data from the queues in the master or send grants to the slave device 200c that enable the slave device 200c to transmit data from the queues in the slave. The data received by the slave device 200c can be transmitted by the slave device 200c in response to a grant transmitted by the master device 200a to the slave device 200c. For example, if the master device 200a determines that data was received by the master device 200a earlier than the data received by the slave device 200c, the data received by the master device 200a can be transmitted before the data received by the slave device 200c.

Alternatively, if the master device 200a determines that data was received by the slave device 200c earlier than data received by the master device 200a, the data received by the slave device 200c can be transmitted before the data received by the master device 200a by transmitting a grant to the slave device 200c so that the data is transmitted by the slave device 200c before data is transmitted by the master device 200a.

Furthermore, if the master device 200a determines that data was received by the master and slave devices 200a,c at the same time, the data received by the master device 200a can be transmitted first followed by the data received by the slave device 200c by transmitting a grant to the slave device 200c so that the data is transmitted by the slave device 200c after the data is transmitted by the master device 200a.

Alternatively, if the master device 200a determines that data was received by the master and slave devices 200a,c at the same time, the data received by the slave device 200c can be transmitted first followed by the data received by the master device 200a by transmitting a grant to the slave device 200c so that the data is transmitted by the master device 200a after the data is transmitted by the slave device 200c.

Figure 5B:
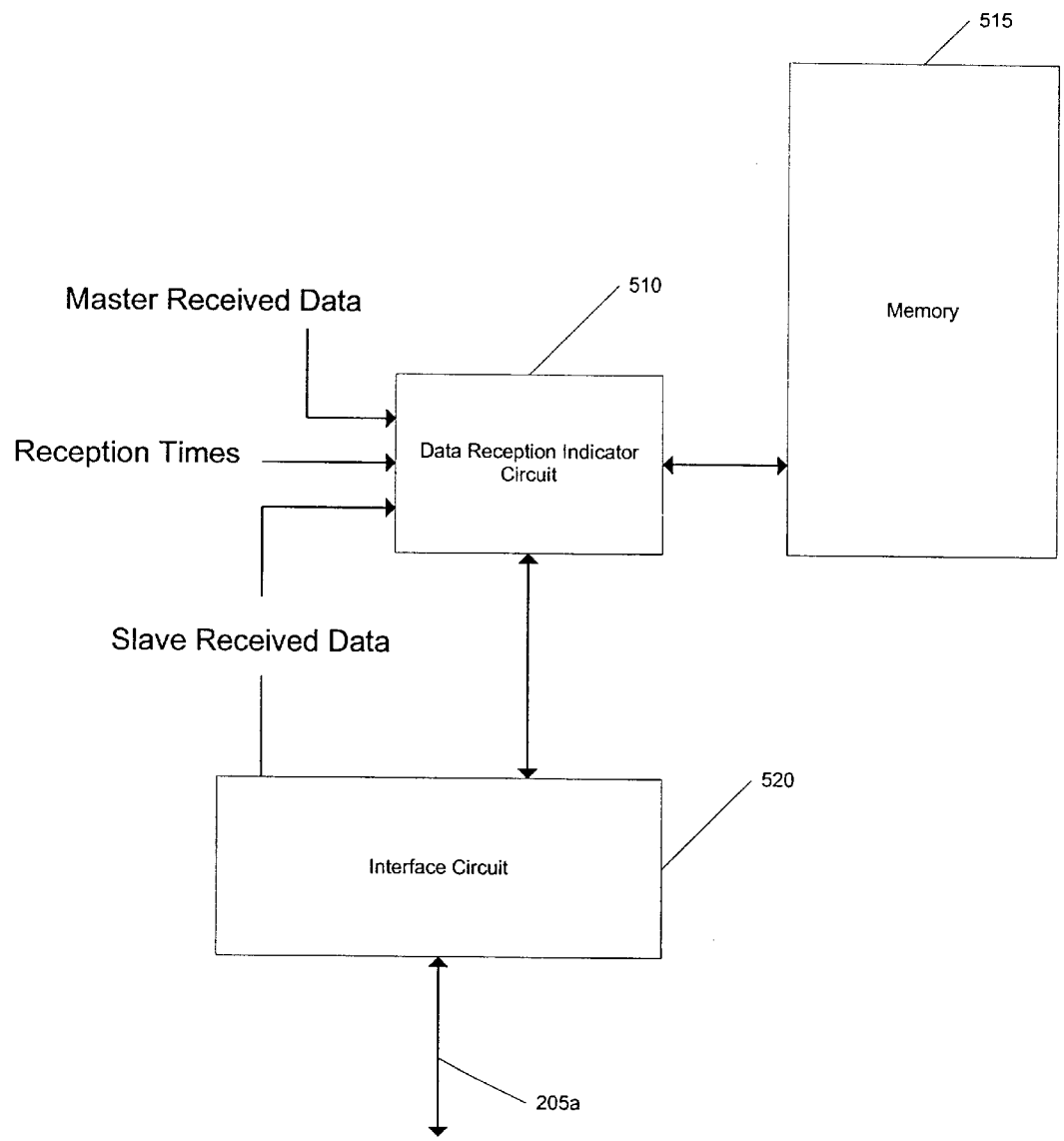
FIG. 5B is a block diagram of a control circuit shown in FIG. 5A.

FIG. 5B is a block diagram that illustrates an embodiment of a control circuit 505 shown in FIG. 5A. According to FIG. 5B a data reception indicator circuit 510 receives information indicating the receipt of data by the master and slave devices 200a,c at reception times. In particular, the data reception indicator circuit 510 receives a master received data indication in response to data being received by the master device 200a and receives a slave received data indication in response to data being received by the slave device 200c. As described above, the information can include an indication of the priority level of the received data and an indication of the output port(s) to which the data is directed. Information is communicated between the master and slave devices 200a,c over interface 205a using an interface circuit 520. In one embodiment, the interface circuit 520 provides a serial interface for the interface 205a.

The data reception indicator circuit 510 stores the information (from the master device 200a and the slave device 200c) in a memory 515 to indicate the order of reception of the data in the master and slave devices 200a,c. The data reception indicator circuit 510 indicates whether data was received by either, both, or neither the master device 200a and the slave device 200c for each reception time. The memory 515 can be a separate portion of the shared memory included in the master device 200a.

The data reception indicator circuit 510 refers to the indications stored in the memory 515 to determine the order of transmission of the data received by master and slave devices 200a,c. The data reception indicator circuit 510 controls the transmission of data from the first and second queues 500a–b so the data is transmitted from the queued memory switch 210 in the order in which the data was received. In particular, the data reception indicator circuit 510 controls the transmission of data from the second queue 500b by transmitting a grant to the slave device 200c via the interface circuit 520. The slave device 200c transmits data from the second queue 500b in response to the grant from the master device 200a.

FIG. 6 is a table that illustrates exemplary indications of the data reception indicator circuit 510 according to the present invention. According to FIG. 6, the data reception indicator circuit-510 indicates whether data was received by the master device 200a and the reception of data by the slave device 200c for a given reception time. In particular, if no cells are received by the master or slave devices 200a,c no entry is made in the memory 515 by the data reception circuit 510. If data was received by the master device 200a and no data was received by the slave device 200c, the data reception indicator circuit 510 stores an address of the memory 515 at which the data received by the master device 200a is stored. If data is received by the slave device 200c and not received by the mast device 200a, the data reception indicator circuit 510 stores an indication that the slave device 200c received data at the reception time. If data is received by the master and slave devices 200a,c at the same reception time, the data reception indicator circuit 510 stores the address of the data received by the master device 200a as well as an indication that the slave device 200c received data at the same reception time.

Figure 7:
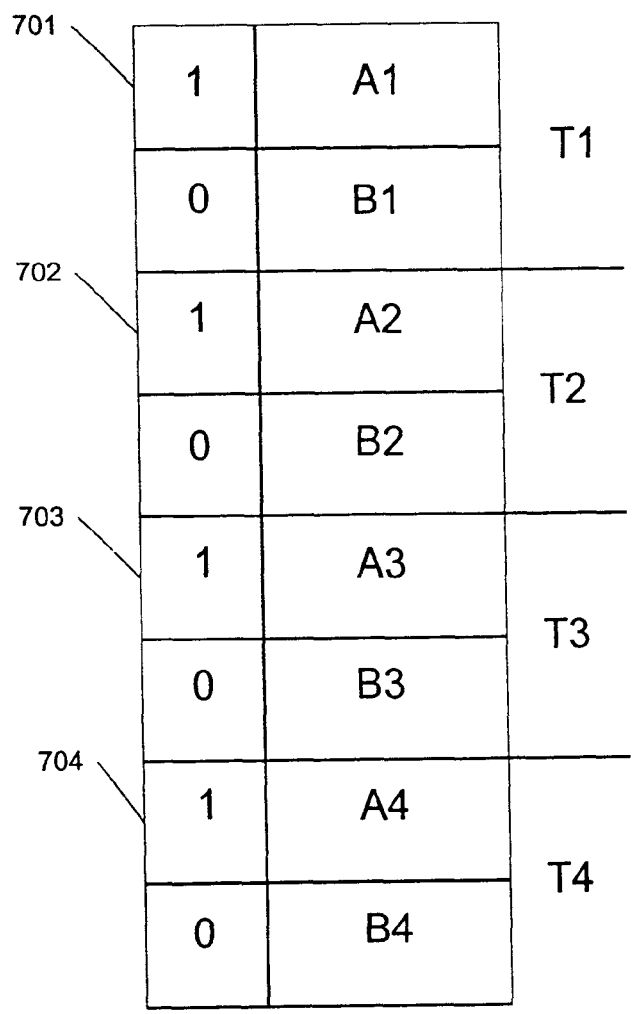
FIG. 7 is a table that illustrates exemplary indications of data reception and associated addresses of received data in the shared memory according to the present invention.

The order of reception of data by the master and slave devices 200a,c can be determined by storing a series of indications at respective reception times such as those shown in FIG. 7. FIG. 7 is a table that illustrates exemplary indications by a data reception indicator circuit 510 in response to data received as shown in FIG. 4 according to the present invention. In particular, the data reception indicator circuit 510 stores an address corresponding to the data A1–A4 and B1–B4 received by the master device 200a at the reception times T1–T4. The data reception indicator circuit 510 also stores indications 701–704 which indicate that data C1–C4 was received by the slave device 200c at the reception times T1–T4 respectively.

Figure 8A:
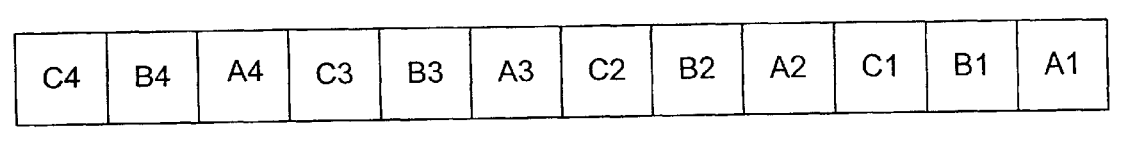

When the output port to which data is directed is available for transmission, the data stored in the shared memory can be transmitted from the queued memory switch 210. Moreover, the data can be transmitted from respective queues of the master and the slave device 200a,c in the order in which the data was received. For example, the indications 701–704 can be used to transmit the data received by the master and the slave from T1 to T4. In particular, the indication 701 can be used by the master device 200a to select data A1 and B1 from the memory 515 for transmission. The master can next transmit a grant to the slave device 200c to enable the transmission of data C1 from the slave device 200c during the next available transmission time. This sequence can be repeated (using the indications in FIG. 7) to produce a stream of data transmitted via the output port as shown in FIG. 8A. Therefore, fairness can be maintained among the input ports of the master and slave devices 200a,c. In particular, the bandwidth allocated to input port 1, input port 2 and input port 32 are approximately equal.

Figure 8B:
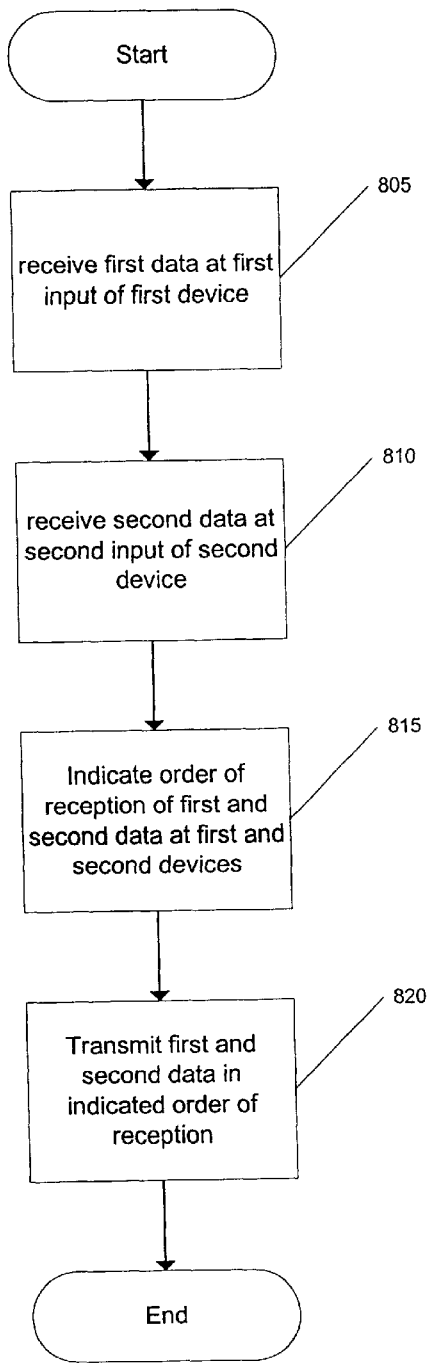
FIG. 8B is a flowchart that illustrates operations of an N×N queued memory switch according to the present invention.

FIG. 8B is a flowchart that illustrates operations of an 2N×2N queued memory switch according to the present invention. According to FIG. 8B, first data is received at a first input of a first device included in the queued memory switch directed to an output of the queued memory switch (block 805). Second data is received at a second input of a second device included in the queued memory switch directed to the same output (block 810).

An indication is made as to the order of reception of the first and second data at the first and second devices (block 815). The indication of block 815 is used to transmit the first and second data from the output of the queued memory switch in the indicated order of reception (block 820).

Figure 9:
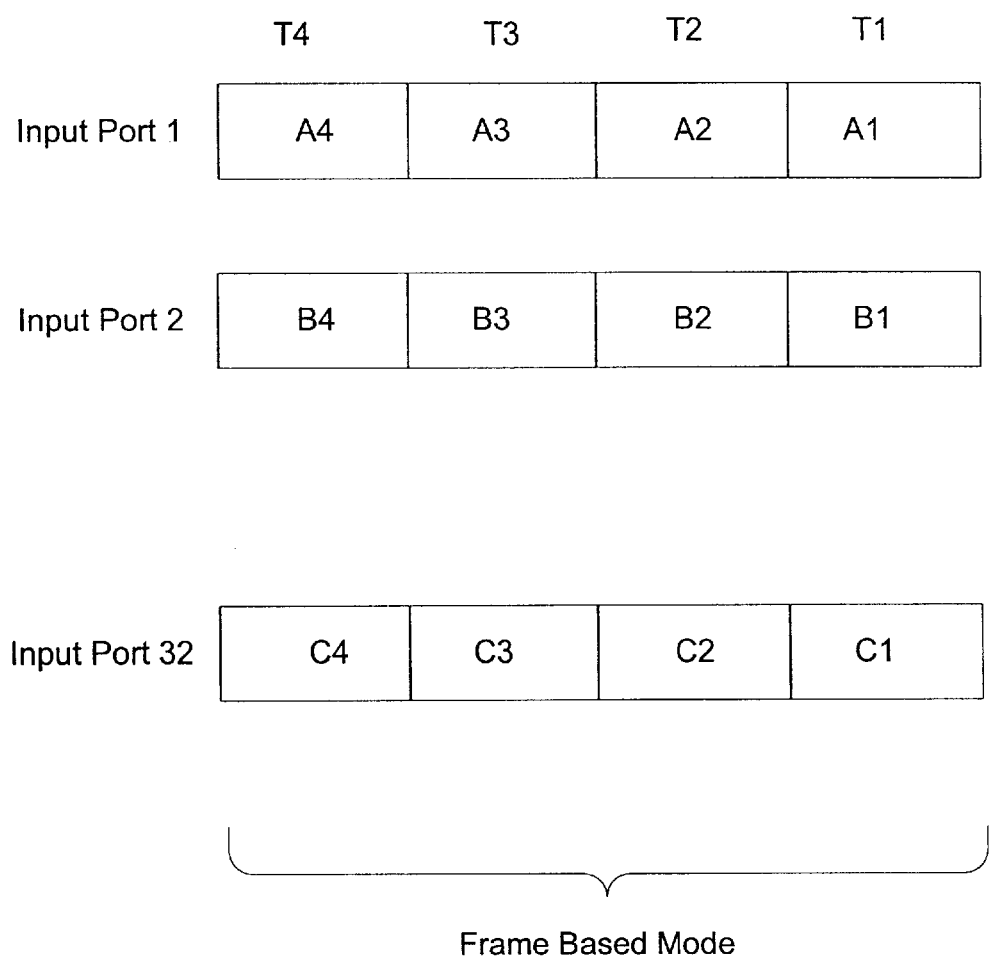
FIG. 9 is a diagram that illustrates receptions of data included in cells organized as frames at the input ports of the queued memory switch of FIG. 2 according to a second embodiment of the present invention.

FIG. 9 is a diagram that illustrates frame based operations of the queued memory switch 210 according to a second embodiment of the present invention. According to FIG. 9, cells including data A1–A4, B1–B4 and C1–C4 are organized as respective frames A, B and C. In frame based operation, the queued memory switch 210 receives contiguous cells at a particular input and to be routed to a particular output which are treated as a frame. For example, contiguous cells, including data A1–A4, are received by the queued memory switch 210 at input port 1 in frame A. Likewise, contiguous cells including data B1–B4 and C1–C4 are received at input port 2 and input port 32 respectively and included in frames B and C.

Figure 10:
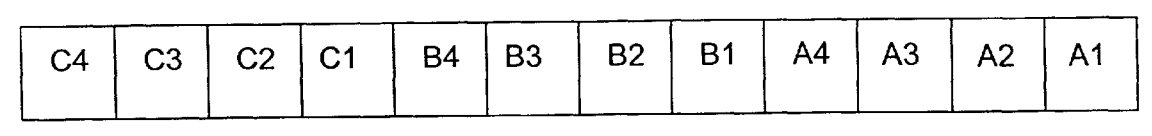

The queued memory switch 210 transmits data included in frames in the order in which the frames were received. For example, once the queued memory switch 210 begins transmitting data received in a first frame, the transmission of that data is completed before the queued memory switch 210 begins transmission of data from a second frame. Therefore, the data included in the frames is transmitted according to the present invention as shown in FIG. 10 wherein the data A1–A4, B1–B4, and C1–C4 are transmitted contiguously.

It will be understood, that the frame based operations according to the present invention are performed for data included in frames of equal priority. It will be further understood that the frame based operations described above may be interrupted if data included in a higher priority frame is received during transmission of lower priority data. For example, referring to FIG. 9, if during transmission of the data A1–A4 the queued memory switch 210 receives data D included in a higher priority frame directed to the same output port, the queued memory switch 210 may interrupt the transmission of data A1–A4 to begin transmission of the higher priority data D.

According to a second embodiment of the present invention, the data reception indicator circuit 510 constructs a two-dimensional control structure for managing the reception and transmission of the data included in each frame in the order in which the frames were received by the master and slave devices 200a, c.

The first dimension of the control structure can be a first linked list of pointers (or frame pointers) that sequentially links each piece of data included in a frame. For example, the linked list of frame pointers can indicate the sequence in which the data was received in a frame. The second dimension control structure can be a second linked list of pointers (or queue pointers) that sequentially links each of the data included in the first cell of each frame received by the master and slave devices 200a,c.

The data reception indicator circuit 510 can construct a linked list of frame pointers as the data included in the cells of a frame are received by the master device 200a. Each frame pointer points to a location of the memory 515 at which the data included in that cell is stored. Moreover, each memory location includes a pointer that points to the data included in the next cell of the frame received by the master device 200a. Accordingly, the list of frame pointers indicate the order in which the data included in the cells of the frame was received.

The queue pointer points to the data included in the first cell of the next frame received by the master device 200a. In other words, the queue pointer indicates which data will be transmitted next after the transmission of the last data in the current frame is complete. The two-dimensional control structure described above will now be described in greater detail by reference to an example.

Figure 11:
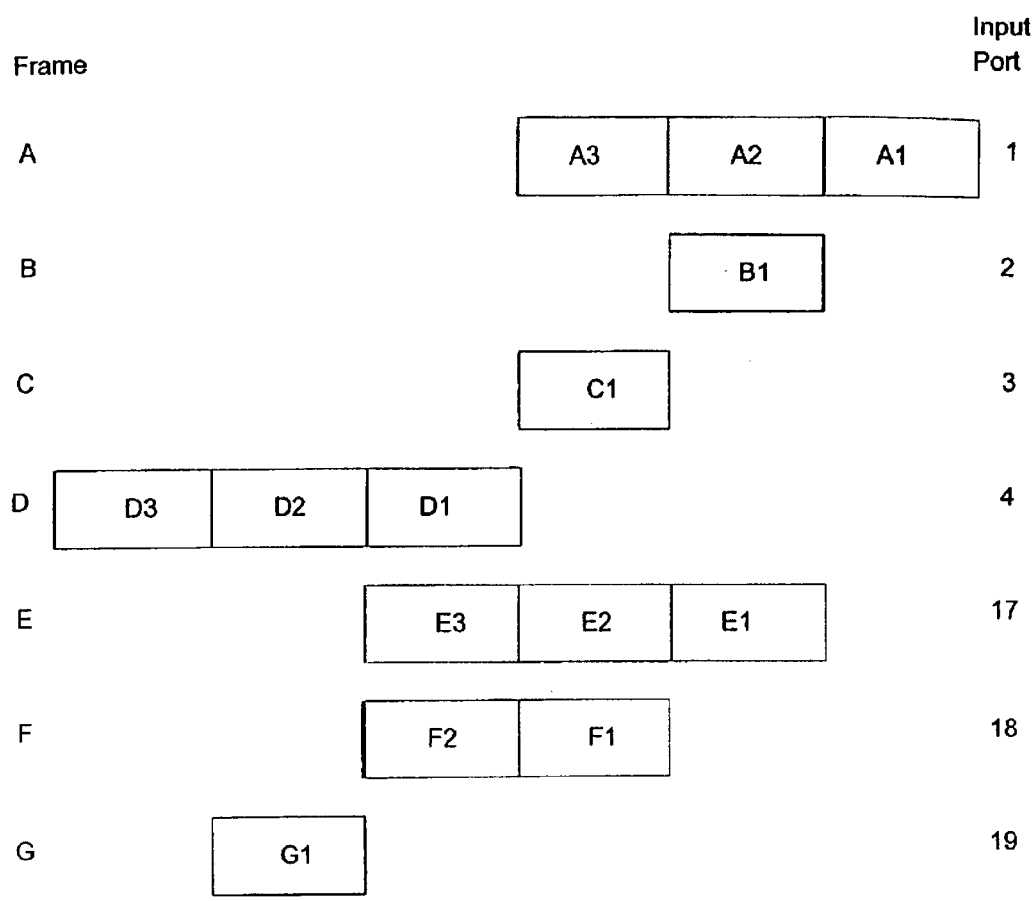
FIG. 11 is a diagram that illustrates exemplary receptions of data included in frames at the input ports of a queued memory switch according to a second embodiment of the present invention.
Figure 12:
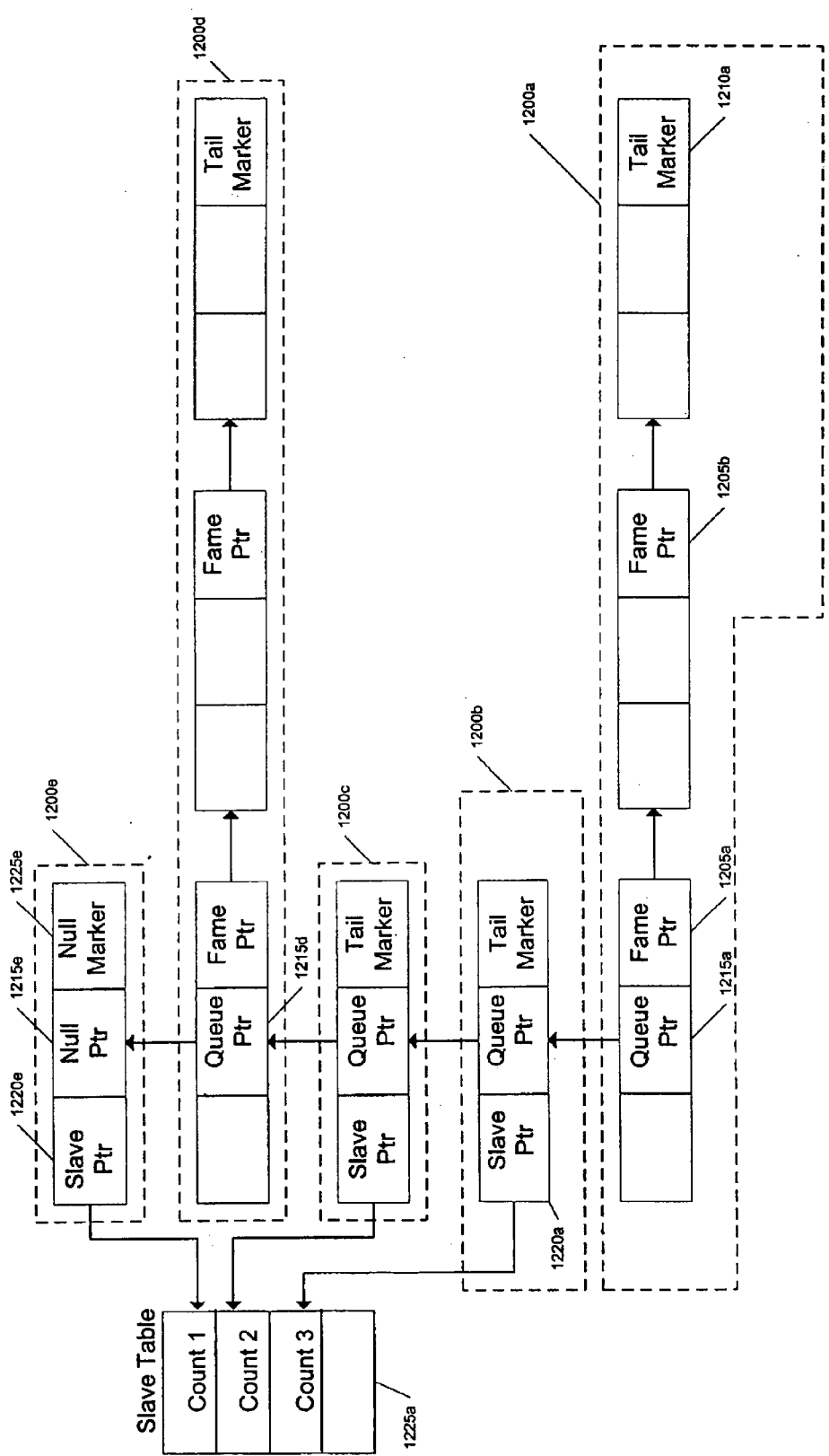
FIG. 12 is a block diagram that illustrates a control structure constructed in response to the reception of frames shown in FIG. 11 according to the second embodiment of the present invention.

FIG. 11 illustrates exemplary data included in a series of cells organized into frames A–G received by the queued memory switch 210 at various reception times. FIG. 12 illustrates an exemplary two-dimensional control structure constructed by the data reception indicator circuit 510 in response to the data received according to FIG. 11. The two-dimensional control structure can provide for contiguous transmission of data in frames in the order in which the frames were received by the master and slave devices 200a,c according to the present invention.

As shown in FIG. 11, data included in frames A–G is received by the queued memory switch 210 at input ports 1–4 and 17–19 respectively. In particular, frames A–D are received at input ports 1–4 by the master device 200a and frames E–G are received at input ports 17–19 by the slave device 200c.

The frames include a variable number of cells and are received by the queued memory switch 210 beginning at a series of reception times. The data reception indicator circuit 510 instantiates the first dimension of the control structure for each frame received by the master device 200a. In particular, the data reception indicator circuit 510 instantiates the first data structure 1200a in response to receiving frame A at the input port 1. Similarly, the data reception indicator circuit 510 instantiates second through fourth data structures 1200b–d in response to receiving frames B, C and D at input ports 2, 3 and 4 respectively.

The first through fourth data structures 1200a–d include frame pointers which point to the data included in the subsequent cell received as part of the frame. During transmission of the data included in the frame, the frame pointers can be used to access the data in the sequence in which it is to be transmitted. For example, frame pointers 1205a–b in the data structure 1200a point to the subsequent data received in the cells of the frame A. The pointer 1205a points to the location of the memory which stores data A2 of frame A. The frame pointer 1205b points to the address of the memory which stores data A3 of frame A. The data structure 1200a can also include a tail marker which indicates that the current data is the last in the frame. For example, tail marker 1210a in data structure 1200a indicates that data A3 is the last data in frame A.

The second dimension of the two-dimensional control structure can be a queue pointer which points to the data received in the first cell of the subsequently received frame. For example, queue pointer 1215a in the data structure 1200a points to the data structure 1200b that corresponds to the data B1 of frame B. Accordingly, after the data referenced by data structure 1200a has been transmitted from the queued memory switch 210, the data referenced by the data structure 1200b (i.e., the data received as part of frame B) will be transmitted next.

According to the present invention, the two-dimensional control structure can also include an indication that the slave device 200c received data included in a cell of a frame during the same reception time at which the master device 200a started receiving data included in a frame. For example, the data structure 1200b includes a slave pointer 1220a which indicates that the slave device 200c began receiving data E1 of frame E at input port 17 at the same time at which the master device 200a began receiving data B1 of frame B at input port 2.

The data reception indicator circuit 510 also maintains a slave table 1225a in which the number of cells included in the frame received by the slave device 200c is recorded. Accordingly, when the slave device 200c is granted permission for transmission on the output port, the master device 200a transmits a number of grants to the slave device 200c that is equal to the count of the cells in the frame. For example, slave pointer 1220a points to a first entry in the slave table 1225a which stores the number of cells included in frame E received by the slave device 200c. Accordingly, after the data included in frame B is transmitted from the queued memory switch 210, the master device 200a will transmit three grants to the slave device 200c thereby enabling the slave device 200c to transmit all of the data included in frame E from the queue in the slave device 200c associated with the output port 1.

The count stored in the slave table 1225a can be generated by the number of indications received by the data reception indicator circuit 510 that indicates the number of cells received by the slave device in the current frame. Accordingly, the data reception indicator circuit 510 updates the count as the cells included in the frame are received by the slave device 200c.

If the slave device 200c begins receiving a second frame after the master device 200a begins the reception of a first frame, the data reception indicator circuit 510 instantiates a data structure which includes a slave pointer that points to a count entry in the slave table 1225a corresponding to the data of the frame received by the slave device 200c.

The data structure 1200e is instantiated to accommodate the reception of data in a next frame by the slave device 200c after the master device 200a begins receiving data in a current frame. For example, when the master device 200a begins receiving data in frame D at input port 4, the data reception indicator circuit 510 instantiates the data structure 1200d. Before the master device 200a receives all of the data included in frame D, the slave device 200c begins receiving data in frame G. Accordingly, the data reception indicator circuit 510 instantiates the data structure 1200e which indicates, by the slave pointer 1220e, the current cell count for frame G. Moreover, the data reception indicator circuit 510 updates the queue pointer 1215d to point to the data structure 1200e. When the transmission of the data in frame D is complete, the data reception indicator circuit 510 will transmit a number of grants to the slave device 200c equal to the number of counts stored in the slave table pointed to by the slave pointer 1220e. A null marker 1225e in the data structure 1200e indicates that no first cell of a frame was stored in the master at the corresponding time that the first cell of frame G was stored. A null pointer 1215e in the data structure 1200e indicates that frame G is the last frame in the queue.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed:

1. A method of switching data from inputs of a queued memory switch to outputs of the queued memory switch, the method comprising the steps of:

receiving first data at a first input of a first device included in the queued memory switch directed to an output of the queued memory switch;

receiving second data at a second input of a second device included in the queued memory switch directed to the output;

determining an order of reception of the first and second data; and transmitting the first and second data from the output of the queued memory switch in the determined order of reception, wherein the step of determining comprises the step of determining reception of the first and second data at a series of reception times, wherein the step of determining comprises the steps of:

indicating reception of the first data and non-reception of the second data if the first data is received and the second data is not received at the reception time;

indicating non-reception of the first data and reception of the second data if the second data is received and the first data is not received at the reception time;

indicating the reception of the first data and reception of the second data if the first and second data are received at the reception time; transmitting an indication of reception of the second data from the second device to the first device; and storing the indication in the first device.

2. The method of claim 1, wherein the step of transmitting the first and second data from the output of the queued memory switch in the determined order of reception comprises the steps of:

determining that the output of the queued memory switch is available;

transmitting a grant from the first device to the second device at a time with respect to the transmission of the first data based on the order of reception of the first and second data; and transmitting the second data from the second device on the output of the queued memory device responsive to the grant.

3. The method of claim 1, wherein the step of determining further comprises the steps of:

storing a first indication of the reception of the first data at each reception time; and storing a second indication of the reception of the second data at each reception time.

4. The method of claim 3, wherein the first and second indications are associated.

5. The method of claim 1, wherein the step of transmitting further comprises the steps of:

determining that the output of the queued memory switch is available;

transmitting a grant from the first device to the second device in response to an indication that the second data was received at a reception time and the first data was not received at the reception time, wherein the grant covers transmission of the second data prior to transmission of the first data; and transmitting the second data from the second device on the output of the queued memory device responsive to the grant.

6. The method of claim 1, wherein the first and second data comprise respective first and second frames that include the first and second data, wherein the step of determining further comprises the step of storing a count of cells included in the second frame.

7. The method of claim 6, wherein step of transmitting comprises the steps of:
   determining that the output of the queued memory switch is available;
   transmitting a number of grants from the first device to the second device in response to an indication that the second frame was received at the reception time and the first frame was not received at the reception time, wherein the number of the grants corresponds to the count of cells included in the second frame, wherein the grant covers transmission of the second data prior to transmission of the first data; and
   transmitting the data included in the second frame from the second device on the output of the queued memory switch responsive to the number of grants.

8. The method of claim 1, wherein the first and second data comprise respective first and second cells that include data.

9. The method of claim 1, wherein the first and second data comprise respective first and second frames that include data.

10. The method of claim 1, wherein at least one of the first and second data is directed to the first and a second output of the queued memory switch.

11. The method of claim 1, wherein the first and second data have respective associated first and second priorities, wherein the step of transmitting further comprises the step of transmitting the first and second data in the order of reception if the first and second priorities are equal.

12. A system for switching data from inputs of a queued memory switch to outputs of the queued memory switch, the system comprising:
   means for receiving first data at a first input of a first device included in the queued memory switch directed to an output of the queued memory switch;
   means for receiving second data at a second input of a second device included in the queued memory switch directed to the output;
   means for determining an order of reception of the first and second data; and
   means for transmitting the first and second data from the output of the queued memory switch in the determined order of reception, wherein the means for determining comprises means for determining reception of the first and second data at a series of reception times, wherein the means for determining comprises:
      means for indicating reception of the first data and non-reception of the second data if the first data is received and the second data is not received at the reception time;
      means for indicating non-reception of the first data and reception of the second data if the second data is received and the first data is not received at the reception time; and
      means for indicating the reception of the first data and reception of the second data if the first and second data are received at the reception time; means for transmitting an indication of reception of the second data from the second device to the first device; and means for storing the indication in the first device.

13. The system of claim 12, wherein the means for transmitting the first and second data from the output of the queued memory switch in the determined order of reception further comprises:
   means for determining that the output of the queued memory switch is available;
   means for transmitting a grant from the first device to the second device, wherein the grant covers transmission of the second data prior to transmission of the first data; and
   means for transmitting the second data from the second device on the output of the queued memory device responsive to the grant.

14. The system of claim 12, wherein the means for determining further comprises:
   a means for storing a first indication of the reception of the first data at each reception time; and
   means for storing a second indication of the reception of the second data at each reception time.

15. The system of claim 14, wherein the first and second indications are associated.

16. The system of claim 12, wherein the means for transmitting further comprises:
   means for determining that the output of the queued memory switch is available;
   means for transmitting a grant from the first device to the second device in response to an indication that the second data was received at a reception time and the first data was not received at the reception time, wherein the grant covers transmission of the second data prior to transmission of the first data; and
   means for transmitting the second data from the second device on the output of the queued memory device responsive to the grant.

17. The system of claim 12, wherein the first and second data comprise respective first and second frames that include the first and second data, wherein the means for determining further comprises means for storing a count of cells included in the second frame.

18. The system of claim 17, wherein means for transmitting further comprises:
   means for determining that the output of the queued memory switch is available;
   means for transmitting a number of grants from the first device to the second device in response to an indication that the second frame was received at the reception time and the first frame was not received at the reception time, wherein the number of the grants corresponds to the count of cells included in the second frame, wherein the grant covers transmission of the second data prior to transmission of the first data; and
   means for transmitting the data included in the second frame from the second device on the output of the queued memory switch responsive to the number of grants.

19. A computer program product for switching data from inputs of a queued memory switch to outputs of the queued memory switch, the computer program product comprising:
   a computer readable storage medium having computer-readable program code means embodied in said medium, said computer-readable program code means comprising:
      computer-readable program code means for receiving first data at a first input of a first device included in the queued memory switch directed to an output of the queued memory switch;
      computer-readable program code means for receiving second data at a second input of a second device included in the queued memory switch directed to the output;

computer-readable program code means for determining an order of reception of the first and second data; and computer-readable program code means for transmitting the first and second data from the output of the queued memory switch in the determined order of reception, wherein the computer-readable program code means for determining comprises computer-readable program code means for determining reception of the first and second data at a series of reception times, wherein the computer-readable program code means for determining comprises:

computer-readable program code means for indicating reception of the first data and non-reception of the second data if the first data is received and the second data is not received at the reception time;

computer-readable program code means for indicating non-reception of the first data and reception of the second data if the second data is received and the first data is not received at the reception time;

computer-readable program code means for indicating the reception of the first data and reception of the second data if the first and second data are received at the reception time; computer-readable program code means for transmitting an indication of reception of the second data from the second device to the first device; and computer-readable program code means for storing the indication in the first device.

20. The computer program product of claim 19, wherein the computer-readable program code means for transmitting the first and second data from the output of the queued memory switch in the determined order of reception further comprises:

computer-readable program code means for determining that the output of the queued memory switch is available;

computer-readable program code means for transmitting a grant from the first device to the second device; and computer-readable program code means for transmitting the second data from the second device on the output of the queued memory device responsive to the grant.

21. The computer program product of claim 19, wherein the computer-readable program code means for determining further comprises:

computer-readable program code means for storing a first indication of the reception of the first data at each reception time; and computer-readable program code means for storing a second indication of the reception of the second data at each reception time.

22. The computer program product of claim 21, wherein the first and second indications are associated.

23. The computer program product of claim 19, wherein the means for transmitting further comprises:

computer-readable program code means for determining that the output of the queued memory switch is available;

computer-readable program code means for transmitting a grant from the first device to the second device in response to an indication that the second data was received at a reception time and the first data was not received at the reception time; and computer-readable program code means for transmitting the second data from the second device on the output of the queued memory device responsive to the grant.

24. The computer program product of claim 19, wherein the first and second data comprise respective first and second frames that include the first and second data, wherein the computer-readable program code means for determining further comprises computer-readable program code means for storing a count of cells included in the second frame.

25. The computer program product of claim 24, wherein means for transmitting further comprises:

computer-readable program code means for determining that the output of the queued memory switch is available;

computer-readable program code means for transmitting a number of grants from the first device to the second device in response to an indication that the second frame was received at the reception time and the first frame was not received at the reception time, wherein the number of the grants corresponds to the count of cells included in the second frame; and computer-readable program code means for transmitting the data included in the second frame from the second device on the output of the queued memory switch responsive to the number of grants.

* * * * *